Jan. 7, 1936. A. A. CLAASSEN 2,027,300
METHOD OF TREATING MOLTEN STEEL
Filed July 28, 1933
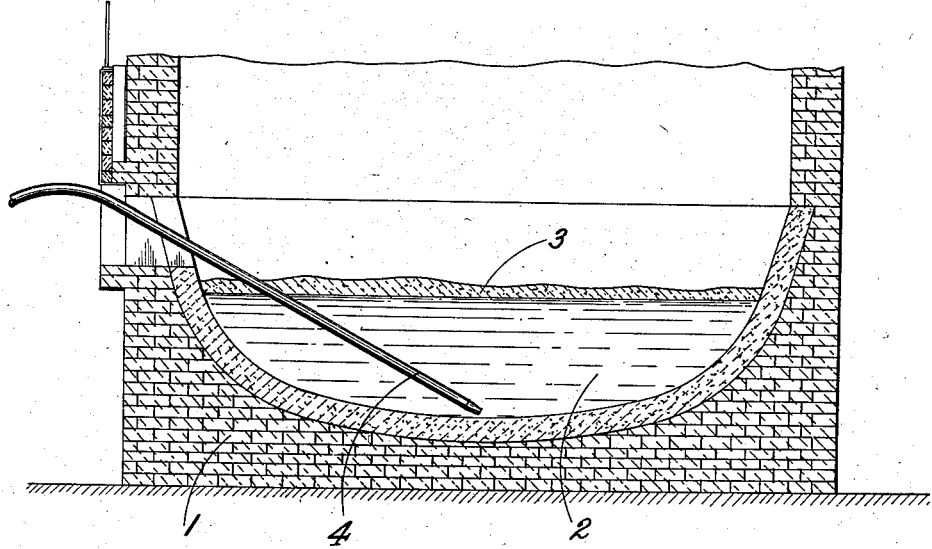
Inventor
ALVIN A. CLAASSEN
By Richey & Watts
Attorneys Patented Jan. 7, 1936

2,027,300

UNITED STATES PATENT OFFICE 2,027,300

METHOD OF TREATING MOLTEN STEEL

Alvin A. Claassen, Chicago, Ill., assignor of one-half to James L. Hyland, Chicago, Ill.

Application July 28, 1933, Serial No. 682,641

34 Claims. (Cl. 75—27)

This invention relates to the metallurgical art. In general, it relates to new and improved methods of treating molten steel, and more particularly to making steel in an open hearth furnace.

In the production of open hearth steel it has been commonly accepted practice heretofore to include in the melt a carburizing agent sufficient in amount to bring the carbon content of the melt up to a certain amount without unduly increasing the sulphur content. This desired content of carbon is intended to be sufficiently high in the original charge so that the carbon will not be reduced to an undesirably small percentage by the time the sulphur has been reduced to within the specified amounts. For example, charges consisting of about 50% of steel scrap and 50% of pig iron have been used heretofore. Attempts have been made to replace some of the pig iron, as by substituting scrap iron or coke, but these expedients were discarded as objectionable because they increased the sulphur content of the melt and hence increased the difficulty of working out the sulphur. Prior to this invention blast furnace pig iron has been widely used, either alone or with other materials as a carburizer, due to its high carbon and low sulphur contents. This blast furnace pig iron, however, is relatively expensive and the cost of production of steel by its use is high, so that a less costly substitute therefor is greatly to be desired. Scrap iron is cheaper than such pig iron, but has a high sulphur content and its use as a carburizer is limited for that reason, since in open hearth steel the amount of sulphur should be kept as low as possible. "Pig iron", as the term is used herein, refers to the composition of the iron and not to its shape.

The refining of steel in an open hearth furnace as practiced prior to my invention was carried out within certain well defined boundaries and limitations. For example, it was considered essential, as aforesaid, that an open hearth charge should melt with a much higher carbon content than was desired in the finished product. If the heat melted lower in carbon than expected, the liquid capacity of the furnace and the amount of sulphur which had to be eliminated imposed more or less definite limitations on the final carbon content in the metal. Where, after working the heat to the liquid capacity of the furnace, the contents of carbon and sulphur in the melt were outside of certain rather limited ranges, that is, where the carbon was below a certain fairly well defined amount and the sulphur was above a certain fairly well defined amount, the heat could not be finished and tapped within the specifications for which the charge was made but had to be tapped on specifications calling for lower carbon and higher sulphur contents. It frequently happened that charges melted unexpectedly low in carbon and high in sulphur, and the efforts to finish such heats within the sulphur specifications resulted in such a reduction of the carbon content that the heat became a "sticker", that is, one which had to be worked and heated much longer than the time usually required in order to lower the sulphur and to tap the metal out of the furnace anywhere near the finish specifications and sometimes to tap it out at all.

Perhaps the most commonly used expedient of eliminating sulphur while retarding the loss of carbon was to thin the slag by the addition to the slag of a considerable quantity, often several hundred pounds, of fluor spar and then to add large quantities, often several tons, of lime. This round of "spar and lime" expedited elimination of sulphur but was attended with carbon elimination. Hence it was often accompanied or followed by the addition of pig iron to offset the loss of carbon. The liquid capacity of the furnace placed a definite limitation on the quantities of spar and lime and pig iron which could be so added. As a general rule, it has not been possible heretofore to treat a normal heat in an open hearth furnace with more than two fairly large "rounds" of spar and lime. More than two such "rounds" presented the danger that the liquid capacity of the furnace would be exceeded before enough pig iron could be supplied to permit the heating of the metal to tapping temperature. When the liquid capacity of the furnace is exceeded, the slag and possibly the metal runs out through the port holes and doors.

All the foregoing and many other limitations have been well recognized in the open hearth furnace industry for many years to my knowledge, but so far as I am aware, no one has ever successfully overcome these limitations.

The present invention is primarily concerned with simplifying open hearth furnace practice and greatly extending the previously hampering limitations. It also is concerned with cheapening the cost of manufacturing of open hearth steel by reason of dispensing largely, if not entirely, with the use of expensive pig iron by the substitution therefor of much cheaper carbon containing materials, by saving costs of spar, lime and other materials used in working heats, by insuring that each heat may be tapped out within the desired finish specifications with substantial freedom from danger of "stickers", and attaining all these advantages without any sacrifice in quality or properties in the resulting steel. The present invention has many other advantages which will be set forth hereinafter. This application is a continuation in part of my copending United States patent application Ser. No. 567,298, filed October 6, 1931.

The present invention is based largely on my discovery that new, unexpected and far reaching results may be obtained by introducing a suitable carbon bearing material into the molten metal in an open hearth furnace after the metal is well covered with slag. This invention enables one to attain many desired objects, including such important objects as controlling the carbon content in the metal as by retarding its rate of elimination, by holding it substantially constant, by increasing it within wide ranges, facilitating sulphur elimination to within the specifications and facilitating the raising of the temperature of the metal to the point where it may be tapped from the furnace after the impurities are within a desired finish specification.

Various carbon containing substances may be used according to the present invention. For example, various liquid hydrocarbons, or powdered solids including carbon, may be used. Liquid hydrocarbons which are suitable may include light or heavy petroleum oils or even tars. Powdered hard and soft coal and oil coke are suitable and may be used as such or with a liquid hydrocarbon or with other powdered materials such as ferromanganese, spiegel, ferrosilicon and the like. I prefer, however, to use a heavy petroleum oil because of the ease and rapidity with which it may be introduced into the metal. I believe that when such a hydrocarbon oil is properly introduced into the molten metal, it is "cracked" or broken down by reason of the high temperature of the metal with the resultant liberation of extremely finely divided particles of carbon which are prevented from escaping from the metal by the thick slag layer on the surface of the latter and which are thus retained in or on the metal for a sufficient length of time to be absorbed by the metal. I also believe that the hydrocarbon has an important bearing on the elimination of sulphur, for marked decreases in sulphur content in the metal have been noted during and for a short time after introduction of the oil. This decrease may be caused by combination of hydrogen from the oil with the sulfur forming hydrogen sulfide gas which escapes, or by a reduction of the lime in the slag by the carbon of the oil with resultant combining of the partially reduced lime with sulfur of the metal. In general, I may use any material containing carbon which can be absorbed by the molten metal under the conditions existing in the furnace.

One example of the prior commonly accepted practice of making basic open hearth steel is as follows:- The charge consisted of about 50% of steel scrap and 50% of pig iron with the usual fluxing and slag forming materials.

After the charge was melted it was worked until the slag thickened, then was treated with a heavy round of spar and lime, and sometimes with additions of pig iron or spiegel in case the carbon in the metal was low. Further working reduced the sulphur content, but where the reduction did not bring the sulphur within the finish specifications another heavy round of spar and lime was used, sometimes accompanied with the addition of pig iron or spiegel, and was followed with further working of the heat. If the sulphur was not reduced to within the finish specifications as a result of this working, the heat had to be tapped out on a specification permitting higher sulphur, for no additional rounds of spar and lime were permissible because of the liquid capacity of the furnace. Often the sulphur was brought within specification limits by one or two rounds of spar and lime, but at such time the carbon content frequently was low and the viscosity of the metal was so high as to interfere seriously with the rapid heating of the molten metal to a temperature satisfactory for tapping. The viscosity of the molten metal in an open hearth furnace varies within rather wide limits at a given temperature with variation in carbon content. Consequently, when the sulphur in the metal was within specifications and the carbon was low, the metal was viscous and required prolonged heating to attain a tapping fluidity and temperature. The customary method of increasing the carbon content at such a stage of a heat was to add pig iron to the molten metal, but when cold pig iron was put into the molten metal the temperature of the latter was lowered thereby and its viscosity further increased, and the metal had to be heated for an additional length of time to bring it up to tapping temperature. Frequently the carbon was so low that it could not be raised to within the finish specification by adding pig iron because of danger of excessive chilling of the metal. "Stickers" frequently resulted from the practice of adding pig iron.

In contrast with the foregoing typical example of the prior art, I have been able satisfactorily to make steel by this invention from furnace charges of about 45% to 55% of steel scrap and 55% to 45% of iron scrap without any pig iron whatsoever. The steel and iron may vary widely. The steel may range up to 75% or more, and the iron may range up to 55% or even more. Such charges melt low in carbon and high in sulphur. One example of this practice is as follows:—A 120 ton charge consisting of about 55% steel scrap and 45% scrap iron was placed in a basic open hearth furnace, together with the necessary amounts of limestone and fluxing materials and the charge was melted. After the limestone had been thoroughly calcined, that is after the "lime boil" was completed, and the molten metal was covered with a thick layer of lime and lime silicate slag of the ordinary type, the first test sample of the molten metal contained about .56% carbon, about .080% sulphur, about 1.10% silicon and about .75% manganese. The finish specifications required between about .28% and .35% of carbon and under .05% of sulphur. After the heat had been worked in the ordinary manner for about one hour, during which time several additions of burnt lime and about 1500 pounds of spar were made, the carbon and sulphur contents of the metal as shown by a second test sample were approximately .28% and .062% respectively. Then about 1000 pounds of spiegel were added and had the effect of retarding the rate of carbon elimination, while decreasing the sulphur content from about .062% to about .055%. About one-half hour later the carbon content was about .21% and the sulphur about .048%. Within the next forty minutes about 370 gallons of petroleum oil, commonly termed "gas oil" and testing between about 35° and 37° Baumé and having a sulphur content of less than about .12% was introduced into the metal by being forced under about 180 pounds pressure thru a ¾" iron pipe having its discharge end swaged down to provide only a small opening and located well beneath the surface of the metal. If the oil is turned on prior to immersion of the iron pipe in the bath, the molten metal will not freeze in the nozzle and clog the pipe. The metal will, however, freeze on the outside of the pipe and form a protective coating, thus preventing melting of the pipe. The oil so introduced agitated the molten metal and assisted in removing foreign inclusions therefrom. Shortly after this oil had been so added, a test sample of the metal showed about .39% of carbon and .41% of sulphur. The heat was tapped out about twenty minutes later with a carbon content of .32% and a sulphur content of about .035% in the ladle.

Another example is as follows:—A 120 ton charge of about 45% steel scrap and 55% scrap iron was melted in a basic open hearth furnace, together with suitable amounts of limestone and other fluxing materials. The heat was to finish with about .08% carbon and under .055% sulphur. The composition of the metal in the first test sample, taken during the "lime boil" was .18% carbon and .070% sulphur. During the next hour the carbon dropped to .05% and the sulphur to .056%, and during this time about 800 pounds of spar were added. The heat was dead-soft, the sulphur was too high to meet the specifications, and the temperature of the metal too low for tapping. The fracture of the test sample was dull in appearance and indicated the presence of considerable quantities of FeO in the metal. At the same time, the slag contained about 45.6% CaO, about 16.1% SiO, about 11.68% FeO and about 3.54% $Fe_2O_3$.

The "lime boil" being completed, about 2000 pounds of spiegel and two boxes of lime were added and then about 80 gallons of hydrocarbon oil having a gravity of about 36° Baumé were introduced after the fashion described in the preceding example. The carbon content in the metal was raised to .10% while the sulphur was reduced to .048% and at the same time the slag analysis was as follows: CaO 46.56% $SiO_2$ 15.60%, FeO 12.01% and $Fe_2O_3$ 3.22%. A test sample taken at that time showed that the metal had regained its usual luster, thus indicating a higher carbon content and a lower FeO content than in the preceding sample. About one-half hour later about 1500 pounds of spiegel and two boxes of lime were added, followed at the end of another half hour with another box of lime and about 1000 pounds of spiegel and about one hour later the heat was tapped out with a ladle analysis of carbon .06% and sulphur .033%, and a slag analysis of CaO 44.64%, $SiO_2$ 10.90%, FeO 19.20% and $Fe_2O_3$ 5.50%.

When powdered carbon is employed with or without other solids and/or liquids, as above indicated, I prefer to thin the slag, after the "lime boil" ends, with spar and to kill the heat as by adding ferro-silicon, ferro-manganese, or spiegel thereto before introducing the powdered carbon. In this manner I avoid frothy slags. While it is not so important to kill the heat when a hydrocarbon oil is used, there is no objection to doing so and certain advantages result. The powdered materials may be introduced by air pressure, or with oil under pressure.

I believe it is important that the molten metal be well covered with slag before any of the carbon containing materials contemplated by this invention are introduced into the molten metal. In the basic practice the $CO_2$ of the limestone should be substantially eliminated before the carbon is added according to my invention. Apparently the carbon is not readily retained by the molten metal to any appreciable or noteworthy extent if introduced during rapid elimination of $CO_2$, or in general, before a thick slag covers the metal.

It is preferable to turn off the furnace burners but to leave the stack damper open when introducing oil for oil vapor forms above the slag and should be removed from the furnace promptly. I believe the slag retains the carbon in contact with the metal until absorbed in large measure by the metal.

While I have described my invention hereinabove in some detail in connection with the basic open hearth process, the invention is also applicable to the acid open hearth process. In the latter case it has been customary heretofore to use charges composed of about 70% steel scrap and 30% pig iron. By my invention it is possible to alter these charges by considerably decreasing the pig iron and proportionately increasing the steel scrap.

The carbon containing material is introduced into the molten metal generally according to the manner and under the circumstances and conditions above outlined. The metal should be covered with a deep slag when the carbon is introduced.

The foregoing examples will make apparent to those skilled in the art many of the potential possibilities of the present invention. For instance, it will be clear that the use of pig iron can be entirely avoided in the basic process and largely avoided in the acid open hearth process. Heats which melt unexpectedly low in carbon may have their carbon content raised at any time after the metal is well covered with slag and may be finished within the specifications for which they were charged. The carbon content in the heat may be controlled over a wide range and during a long time interval, for example while the sulphur is being eliminated, without danger of encountering stickers or exceeding the liquid capacity of the furnace. Heats in which the carbon falls below approximately .05% may be worked to eliminate large quantities of sulphur and tapped out without any undue delay and with carbon as high as .20% or higher, depending upon the amount of carbon containing material employed. The amount of fluorspar and lime required may, in many cases, be considerably reduced in contrast to the prior practice. A heat may be worked for a much longer time, if necessary, than was heretofore possible, without the addition of pig iron and large quantities of fluorspar or spiegel. The content of iron oxide in the metal may be reduced.

While I have described the introduction of carbon containing material into the molten metal after the metal has been covered with a thick layer of slag, and more specifically after the "lime boil" in basic practice has been completed, it is not to be inferred that I limit the introduction of such carbon containing materials to any particular time after the metal is covered with the slag, for I may introduce carbon containing materials even as late as just prior to tapping; or I may introduce the carbon containing materials at several different times after the slag covers the metal and prior to tapping. When the carbon containing materials are introduced under pressure, agitation of the metal and slag results, and oxides, foreign bodies and gases, are brought to the surface of the metal where the oxides and some of the impurities may react with or be retained by the slag, and the gases may escape. In this manner comparatively low grade starting materials may be refined and high grade products low in impurities and comparatively free from gaseous and foreign inclusions may be obtained. As a result of extensive commercial use of this process, I have found that steels made according to my invention from scrap iron and scrap steel are favorably comparable with steels made according to the prior practice from charges which employed high grade materials and as much as 50% of pig iron.

While many types of hydrocarbons as above mentioned may be used with this invention, and while it may be desirable in some instances to employ petroleum oils relatively low in sulphur content, I have found that the molten metal has no noticeable tendency to pick up sulphur from the carbon containing materials employed, and hence for most purposes the sulphur content, for example in a hydrocarbon oil employed, is relatively unimportant.

The figure of the drawing which accompanies and forms a part of this specification shows diagrammatically one form of apparatus with which the present invention may be practiced.

In the drawing, I designates generally an open hearth furnace; 2 molten metal therein; 3 a layer of slag on the surface of the molten metal; and 4 a tube thru which suitable carbon containing material may be delivered into the molten metal.

Having thus described my invention so that those skilled in the art may be able to practice the same, what I desire to secure by Letters Patent is defined in what is claimed; it being understood that the scope of the invention is defined in what is claimed and that the foregoing examples have been given only for purposes of illustration.

What is claimed is:

1. The method of making open hearth steel which includes the steps of heating in an open hearth furnace a molten metal charge covered with a thick layer of slag, working and refining the metal and finally tapping it out of the furnace, and controlling the carbon content of the molten metal by introducing beneath the slag covered surface of the molten metal a liquid material containing carbon which can be absorbed by the molten metal.

2. The method of making open hearth steel which includes the steps of heating in an open hearth furnace a molten metal charge covered with a thick layer of slag, working and refining the metal and finally tapping it out of the furnace, and controlling the carbon content of the molten metal by introducing beneath the slag covered surface of the molten metal a quantity of liquid hydrocarbon.

3. The method of making basic open hearth steel which includes the steps of heating in a basic open hearth furnace a molten metal charge consisting predominantly of steel and iron, together with basic slag-forming materials, continuing the heating of the charge after the latter is covered with a basic slag of considerable thickness, working, refining and finally tapping the metal out of the furnace, and while the metal is covered with said slag introducing below the surface of the metal a liquid material containing carbon which can be absorbed by the metal, and retaining carbon of such material in contact with the molten metal until absorbed by the latter.

4. The method of making basic open hearth steel which includes the steps of heating in a basic open hearth furnace a molten metal charge containing between about 45% and about 55% of steel and between about 55% and about 45% of iron, together with basic slag-forming materials, continuing the heating of the charge after the latter is covered with a basic slag of considerable thickness, refining and finally tapping the metal out of the furnace, and while the metal is covered with said slag introducing below the surface of the metal a liquid material containing carbon which can be absorbed by the metal, and retaining carbon of such material in contact with the molten metal until absorbed by the latter.

5. The method of making acid open hearth steel which includes the steps of heating in an acid open hearth furnace a molten metal charge containing a major portion of steel and considerably less than 30% pig iron, together with acid slag-forming materials, continuing the heating of the charge after the latter is covered with an acid slag of considerable thickness, working, refining and finally tapping the metal out of the furnace, and while the metal is covered with said slag introducing below the surface of the metal a liquid material containing carbon which can be absorbed by the metal, and retaining carbon of such material in contact with the molten metal until absorbed by the latter.

6. The method of making open hearth steel which includes the steps of heating in an open hearth furnace a metal charge, together with suitable slag-forming materials, controlling the carbon content of the molten metal by introducing beneath the surface of the molten metal a liquid material containing carbon which can be absorbed by the molten metal and retaining the carbon of said materials in contact with the molten metal by means of a thick relatively quiet layer of slag thereon until substantial quantities of such carbon are absorbed by the molten metal, refining the molten metal and finally tapping it out of the furnace.

7. The method of making open hearth steel, which includes the steps of heating in an open hearth furnace a molten metal charge together with slag-forming materials and forming a relatively quiet slag on the metal, introducing hydrocarbon oil under pressure beneath the surface of the molten metal while the heating of the charge is interrupted, retaining carbon from the oil in contact with the molten metal until substantial quantities are absorbed by the latter, refining the molten metals while covered with said slag, and finally tapping the metal out of the furnace.

8. The method of making basic open hearth steel which includes the steps of melting in an open hearth furnace a metal charge containing between about 45% and about 55% of steel scrap and up to about 55% of iron scrap, together with slag-forming materials including limestone, heating and working the charge until the lime boil is substantially completed, raising the carbon content of the molten metal to within a range suitable for ready working and refining of the metal by introducing beneath the surface of the molten metal covered by a thick layer of relatively thin slag a liquid material containing carbon which can be absorbed by the metal, working and refining the metal to reduce the impurities therein, such as sulphur and gases, to within predetermined ranges, adjusting the carbon content of the metal to finish within a predetermined range when the impurities have been brought to within predetermined range, and finally tapping the metal out of the furnace when the predetermined composition has been attained.

9. The method of making basic open hearth steel which includes the steps of melting in an open hearth furnace a metal charge including a steel scrap and up to about 55% of iron scrap, together with slag-forming material including limestone, heating and working the metal until the lime boil is substantially completed, working and refining the metal to reduce the impurities therein, such as sulphur and gases, to within a predetermined range, controlling the carbon content of the metal between substantial completion of the lime boil and tapping of the metal by introducing beneath the surface of the molten metal covered with a thick layer of slag hydrocarbon oil, the oil being so introduced while the furnace burners are not operating and while the stack draft is open, and finally tapping the metal out of the furnace when a predetermined composition is attained.

10. The method of making basic open hearth steel which includes the steps of melting in a basic open hearth furnace a charge containing a considerable quantity of steel scrap and up to about 55% of iron scrap, together with slag-forming material such as limestone, heating and working the charge until the lime boil is substantially completed and until the metal has been refined and a predetermined composition attained, controlling the carbon content during the refining operations within the range suitable for ready working and refining by introducing beneath the surface of the molten metal a liquid material containing carbon which can be absorbed by the metal, said material being introduced immediately after the slag has been thinned and the metal has been killed, and finally tapping the metal out of the furnace when a predetermined composition is attained.

11. The method of treating steel, which includes the step of increasing the amount of combined carbon in molten steel by introducing a liquid hydrocarbon into a furnace and releasing it beneath the surface of a bath of molten steel covered with slag in an open hearth furnace.

12. A method of treating steel which includes the steps of introducing a hydrocarbon oil into a furnace and releasing it sufficiently far beneath the surface of molten steel covered with slag in an open hearth furnace to permit cracking of the oil and absorption of the thus formed finely divided carbon by the molten metal before escape of such carbon from the molten metal.

13. A method of treating steel which includes the steps of introducing a hydrocarbon oil into a furnace and releasing it sufficiently far below the surface of a bath of molten metal covered with slag in an open hearth furnace to permit cracking of the hydrocarbon and absorption by the metal of the thus liberated carbon before escape of the latter from the molten metal.

14. The method of treating iron or steel, which includes the step of introducing a liquid hydrocarbon into a bath of molten metal covered with slag in an open hearth furnace while exposed to a non-reducing atmosphere.

15. The method of carburizing open hearth steel, which includes the step of introducing a hydrocarbon oil into the bath of molten metal covered with slag in an open hearth furnace and utilizing the temperature of the bath to crack the oil and cause the carbon to combine therein with the metal.

16. The method of carburizing and purifying open hearth steel, which includes the step of introducing a hydrocarbon oil under high pressure in a relatively small stream into a bath of molten metal beneath its surface while the molten metal is covered with slag.

17. The method of regulating the carbon content of and purifying steel while in a molten condition, which includes the steps of forming a basic slag on the surface of the molten metal in an open hearth furnace, and then forcing hydrocarbon oil into the metal beneath the surface thereof, to crack the oil and cause the carbon to combine with the metal and bring about an active agitation of the metal under locally reducing conditions.

18. The method of treating steel while in a molten condition in an open hearth furnace, which includes the steps of forming a basic slag on the surface of the molten bath and introducing hydrocarbon oil into the bath to cause a violent agitation of the metal, a more intimate mixing of the molten metal with the slag, and an increase in the amount of combined carbon in the metal.

19. A method of making open hearth steel, which consists in heating in an open hearth furnace a molten metal charge low in carbon and covered with slag, raising the carbon content to a desired amount by introducing a hydrocarbon oil into the molten metal under the slag so that carbon from the oil will be absorbed by the molten metal, and raising the carbon content in the thus refined metal shortly prior to tapping the metal by introducing additional hydrocarbon oil beneath the surface of the bath.

20. A method of making open hearth steel, which consists in melting in an open hearth furnace a charge low in carbon, together with basic slag forming material, continuing the heating of the charge until the surface of the molten metal is substantially covered with a basic slag, introducing a hydrocarbon oil sufficiently far beneath the surface of the molten metal to permit cracking of the oil and absorption of the thus liberated carbon by the molten metal, and continuing the heating and refining of the metal until the desired composition is attained.

21. A method of making open hearth steel, which consists in melting in an open hearth furnace a charge low in carbon, together with basic slag forming material, continuing the heating of the charge until the surface of the molten metal is substantially covered with a basic slag, introducing a hydrocarbon oil sufficiently far beneath the surface of the molten metal to permit cracking of the oil and absorption of the thus liberated carbon by the molten metal, continuing the heating and refining of the molten metal, and raising the carbon content in the molten metal shortly prior to tapping by introducing additional quantity of hydrocarbon oil beneath the surface of the bath in a manner to adjust the carbon content of the latter to the desired amount.

22. A method of making open hearth steel which consists in melting in an open hearth furnace a charge low in carbon, together with acid slag-forming material, continuing the heating of the molten metal until the surface thereof is substantially covered with acid slag, introducing a quantity of hydrocarbon oil into the molten metal under the surface thereof so that carbon from such oil will be absorbed by the molten metal co-incident with elimination of some of the foreign inclusions and gases from the metal, and continuing the heating and refining of the molten metal to the composition desired.

23. A method of making open hearth steel which consists in melting in an open hearth furnace a charge low in carbon, together with slag-forming material, continuing the heating of the molten metal until the surface thereof is substantially covered with slag, introducing a quantity of hydrocarbon oil into the molten metal to obtain cracking of the oil so that carbon from such oil will be absorbed by the molten metal co-incident with elimination of some of the foreign inclusions and gases from the metal, continuing the heating and refining of the molten metal, and shortly prior to tapping the metal from the furnace raising the carbon content in the refined molten metal to the desired amount by introducing a quantity of hydrocarbon oil low in sulphur content beneath the surface of the bath under conditions similar to those under which the first quantity of hydrocarbon oil was added to the bath.

24. The method of regulating the carbon content of and purifying steel while in a molten condition, which includes the steps of forming an acid slag on the surface of the molten metal in an open hearth furnace, and then forcing hydrocarbon oil into the metal beneath the surface thereof, to crack the oil and cause the carbon to combine with the metal and bring an active agitation of the metal under locally reducing conditions.

25. The method of carburizing open hearth steel, which includes the step of introducing a hydrocarbon oil into the bath of molten metal covered with acid slag in an open hearth furnace and utilizing the temperature of the bath to crack the oil and cause the carbon to combine therein with the metal.

26. The method of making open hearth steel which includes the steps of heating in an open hearth furnace a molten metal charge covered with a thick layer of slag, working and refining the metal and finally tapping it out of the furnace, and during such working and refining controlling the carbon content of the molten metal in the furnace by introducing in a liquid stream beneath the slag covered surface of the molten metal a quantity of material including powdered carbon in solid form.

27. The method of making open hearth steel which includes the steps of heating in an open hearth furnace a molten metal charge covered with a thick layer of slag, working and refining the metal and finally tapping it out of the furnace, and during such working and refining controlling the carbon content of the molten metal in the furnace by introducing beneath the slag covered surface of the molten metal a quantity of material including a liquid hydrocarbon and a powdered carbon in solid form carried thereby.

28. The method of treating steel which includes the step of introducing into molten steel covered with slag in an open hearth furnace and in a small stream under pressure, a petroleum oil having a high specific gravity.

29. The method of treating steel which includes the step of introducing into molten steel covered with slag in an open hearth furnace and in a small stream under pressure, a petroleum oil having a low sulphur content.

30. The method of treating steel which includes the step of introducing into molten steel covered with slag in an open hearth furnace and in a small stream under pressure, a petroleum oil having a specific gravity above about 37° Baumé and a sulphur content below about .12%.

31. The method of treating steel which includes the step of applying pressure to a liquid hydrocarbon in a conduit which extends beneath the surface of a bath of molten steel covered with slag in an open hearth furnace and releasing said hydrocarbon into said bath.

32. The method of treating steel which includes the step of flowing a liquid hydrocarbon under pressure through a tube having an outlet beneath the surface of a bath of molten steel covered with slag in an open hearth furnace.

33. The method of treating steel which includes the step of flowing a liquid hydrocarbon under pressure through a tube having an outlet sufficiently far beneath the surface of a bath of molten steel covered with slag in an open hearth furnace to permit absorption of carbon liberated from said liquid hydrocarbon before escape of such carbon from the molten metal.

34. The method of treating steel while in a molten condition which includes the steps of forming a layer of slag on the surface of the steel and introducing beneath the slag covered surface of the molten metal a quantity of liquid material carrying carbon which can be absorbed by the metal.

ALVIN A. CLAASSEN.